United States Patent
Prados et al.

(10) Patent No.: US 8,599,142 B2
(45) Date of Patent: Dec. 3, 2013

(54) INPUT DEVICE

(75) Inventors: Michael Prados, Redwood City, CA (US); Philippe Alessandrini, Palo Alto, CA (US); Wolfgang Bloehs, Ingolstadt (DE)

(73) Assignee: Volkswagen AG, Wolfsburg (DE)

( * ) Notice: Subject to any disclaimer, the term of this patent is extended or adjusted under 35 U.S.C. 154(b) by 820 days.

(21) Appl. No.: 11/322,035

(22) Filed: Dec. 29, 2005

(65) Prior Publication Data

US 2006/0146036 A1    Jul. 6, 2006

Related U.S. Application Data

(60) Provisional application No. 60/640,411, filed on Dec. 30, 2004.

(51) Int. Cl.
*G06F 3/041* (2006.01)

(52) U.S. Cl.
USPC .................. 345/173; 345/174; 178/18.01

(58) Field of Classification Search
USPC .............................. 345/156, 173–176; 701/1; 178/18.01–18.06
See application file for complete search history.

(56) References Cited

U.S. PATENT DOCUMENTS

| | | | |
|---|---|---|---|
| 4,764,871 A | 8/1988 | van Zanten | 364/426 |
| 4,914,624 A | 4/1990 | Dunthorn | 364/900 |
| 5,943,043 A | 8/1999 | Furuhata et al. | 345/173 |
| 6,118,435 A | 9/2000 | Fujita et al. | 345/173 |
| 6,411,877 B2 | 6/2002 | Bockmann et al. | 701/48 |
| 6,429,846 B2 | 8/2002 | Rosenberg et al. | 345/156 |
| 6,492,979 B1* | 12/2002 | Kent et al. | 345/173 |
| 6,496,200 B1* | 12/2002 | Snibbe et al. | 715/701 |
| 6,577,928 B2* | 6/2003 | Obradovich | 701/1 |
| 6,636,202 B2 | 10/2003 | Ishmael, Jr. et al. | 345/173 |
| 6,822,635 B2* | 11/2004 | Shahoian et al. | 345/156 |
| 6,856,259 B1 | 2/2005 | Sharp | 341/5 |
| 6,958,749 B1 | 10/2005 | Matsushita et al. | 345/175 |

(Continued)

FOREIGN PATENT DOCUMENTS

| | | | | |
|---|---|---|---|---|
| DE | 19731285 | 1/1999 | | H01H 9/18 |
| DE | 20180024 | 1/2001 | | G09G 5/00 |

(Continued)

OTHER PUBLICATIONS www.3m.com; 3M Touch Syatems; www.3m.com/3mtouchsystems/;pp. 2.

(Continued)

*Primary Examiner* — Amare Mengistu
*Assistant Examiner* — Premal Patel
(74) *Attorney, Agent, or Firm* — King & Spalding L.L.P.

(57) ABSTRACT

An input device, especially for a vehicle, comprises a display to display an operating element, a touchscreen arranged above the display for recognition of the position of touching of an operating surface of the touchscreen, a force sensor connected to the touchscreen for measurement of the force exerted on the operating surface of the touchscreen, and a control to generate a warning during touching of the operating surface of the touchscreen in the region of display of the operating element or during pressing on the operating surface of the touchscreen in the region of display of the operating element, and to generate a control command assigned to the operating element, if, after generation of the warning, a force that exceeds a force limit value is exerted on the operating surface.

26 Claims, 10 Drawing Sheets

(56) References Cited

U.S. PATENT DOCUMENTS

| | | | |
|---|---|---|---|
| 7,113,177 B2 | 9/2006 | Franzen | 345/173 |
| 7,158,123 B2 | 1/2007 | Myers et al. | 345/173 |
| 7,499,040 B2 | 3/2009 | Zadesky et al. | 345/204 |
| 2001/0043189 A1* | 11/2001 | Brisebois et al. | 345/156 |
| 2002/0033795 A1 | 3/2002 | Shahoian et al. | 345/156 |
| 2002/0149561 A1 | 10/2002 | Fukumoto et al. | 345/156 |
| 2002/0149571 A1* | 10/2002 | Roberts | 345/174 |
| 2002/0180710 A1 | 12/2002 | Roberts | 345/173 |
| 2003/0006892 A1 | 1/2003 | Church | 340/439 |
| 2003/0048251 A1 | 3/2003 | Liang et al. | 345/156 |
| 2003/0058265 A1 | 3/2003 | Robinson et al. | 345/701 |
| 2003/0076306 A1 | 4/2003 | Zadesky et al. | 345/173 |
| 2003/0095112 A1 | 5/2003 | Kawano et al. | 345/156 |
| 2003/0122779 A1* | 7/2003 | Martin et al. | 345/156 |
| 2003/0184526 A1 | 10/2003 | Nakajima et al. | 345/173 |
| 2004/0046751 A1 | 3/2004 | Heimermann et al. | 345/184 |
| 2004/0075676 A1 | 4/2004 | Rosenberg et al. | 345/701 |
| 2004/0108995 A1 | 6/2004 | Hoshino et al. | 345/173 |
| 2004/0141007 A1 | 7/2004 | Amari et al. | 345/771 |
| 2004/0164971 A1 | 8/2004 | Hayward et al. | 345/179 |
| 2004/0188151 A1 | 9/2004 | Gerpheide et al. | 178/18.01 |
| 2005/0024344 A1 | 2/2005 | Trachte | 345/173 |
| 2006/0022955 A1 | 2/2006 | Kennedy | 345/701 |
| 2006/0028428 A1* | 2/2006 | Dai et al. | 345/156 |
| 2006/0097991 A1 | 5/2006 | Hotelling et al. | 345/173 |
| 2006/0209037 A1* | 9/2006 | Wang et al. | 345/173 |

FOREIGN PATENT DOCUMENTS

| | | | |
|---|---|---|---|
| DE | 10139693 | 5/2002 | G05G 1/08 |
| DE | 20102197 | 5/2002 | G06F 3/037 |
| EP | 773496 | 5/1997 | G06F 3/033 |
| EP | 0836362 | 4/1998 | H04R 9/06 |
| JP | 9167541 A | 6/1997 | G06F 3/041 |
| JP | 2001134382 | 5/2001 | G06F 3/033 |
| WO | 99/66763 | 12/1999 | H04R 7/20 |
| WO | 00/21795 | 4/2000 | B60R 16/02 |
| WO | 01/33103 | 5/2001 | F16F 15/08 |
| WO | 01/54109 | 7/2001 | G09G 5/00 |
| WO | 03032141 | 4/2003 | G06F 3/033 |
| WO | 03/038800 | 5/2003 | G09G 5/00 |
| WO | 03/041046 | 5/2003 | G09G 5/00 |
| WO | 03038800 | 5/2003 | G09G 5/00 |

OTHER PUBLICATIONS www.3m.com ; MicroTouch M150 Touch Monitor ; www.3m.com/3mtouchsystem/products/Monitors/M150.jhtlm ; pp. 3.

www.3m.com ; MicroTouch CRT Touch Monitor; www.3m.com/3mtouchsyatems/Products/Monitors/CRTdesktop.jhtlm ; pp. 2.

www.3m.com ; MicroTouch Chassis Touch LCD Touch Monitors; www.3m.com/3mtouchsystems/Products/Monitors/FPDchassis.jhtlm ; pp. 3.

www.elotouch.com ; Elo TouchSystem Products; www.elotouch.com/products/default.asp ; pp. 2.

www.3m.com ; MicroTouch 5-Wire Resistive Touch Screen; www.3m.com/3mtouchsystems/Products/Resistive/5-wire.jhtml ; pp. 2.

www.3m.com ; MicroTouch PL Analog Resistive Touch Screen; www.3m.com/3mtouchsystems/Products/Resistive/PL.jhtml ; pp. 2.

www.3m.com ; MicroTouch FG Analog Resistive Touch Screens; www.3m.com/3mtouchsystems/Products/Resistive/FG.jhtml ; pp. 2.

www.3m.com ; Specialty Resistive Touch Screens; www.3m.com/3mtouchsystems/Products/Resistive/SRTS.jhtml ; pp. 2.

www.cybertouch.com ; DualForce Touch Screens; www.cybertouch.com/DUALFORCE.html ; pp. 1.

S.A. Hall et al.; "Modeling of Surface Identifying Characteristics Using Fourier Series"; The Department of Cybernetics, University of Reading; www.isrg.reading.ac.uk/common/publications00226.pdf ; pp. 7.

* cited by examiner

INPUT DEVICE

CROSS-REFERENCE TO RELATED APPLICATIONS

This application claims the benefit of U.S. Provisional Application No. 60/640,411 filed on Dec. 30, 2004, entitled "EINGABEVORRICHTUNG", which is incorporated herein by reference in its entirety.

TECHNICAL FIELD

The invention concerns an input device with a touchscreen, especially an input device for a vehicle.

BACKGROUND

A touchscreen is known from DE 201 02 197 U1 (incorporated by reference). A touchscreen for display of electronic signals and an a confirming touch input of characters and symbols, consisting of a function level for display and a key entry and a higher-order, point-deformable protective level corresponding to it, is disclosed in DE 201 02 197 U1. During selection of certain points of the functional level, by means of touch, at least one operating signal for the touch direction (haptic stimulus) of the user is detectable via the protected level at the position of the contact point in the deformed protected level and the operating signal for the touch direction (haptic stimulus) is generated by oscillation elements arranged eccentrically inside and/or beneath the function level. In addition, in the touchscreen known from DE 201 02 197 U1, transmission of the generated oscillations from the function to the protection level occurs by direct contact of the two levels and/or via the edge regions of the levels by rigid or elastic connection elements.

Details concerning touchscreens can be taken, for example, from the Internet page www.3m.com/3mtouchsystems/. The following touchscreens of 3M™ are offered:

MicroTouch™ 12.1" FPD Touch Monitor (vg. www.3m.com/3mtouchsystems/Products/Monitors/FPDdesktop.jhtlm)

MicroTouch™ M150 FPD Touch Monitor (vg. www.3m.com/3mtouchsystems/Products/Monitors/M150.jhtlm)

MicroTouch™ CRT Touch Monitor (vg. www.3m.com/3mtouchsystems/Products/Monitors/CRTdesktop.jhtlm)

MicroTouch™ ChassisTouch™ FPD Touch Monitor (vg. www.3m.com/3mtouchsystems/Products/Monitors/FPDchassis.jhtlm)

MicroTouch™ ChassisTouch™ CRT Touch Monitor (vg. www.3m.com/3mtouchsystems/Products/Monitors/CRTchassis.jhtlm)

Additional details concerning touchscreens can also be taken from the following Internet pages:
www.elotouch.com/products/default.asp
www.3m.com/3mtouchsystems/Products/Resistive/5-wire.jhtml
www.3m.com/3mtouchsystems/Products/Resistive/PL-.jhtml
www.3m-com/3mtouchsystems/Products/Resistive/FG.jhtml
www.3m.com/3mtouchsystems/Products/Resistive/SRTS.jhtml A touch control with haptic feedback for entry of signals into a computer and output of forces to a user of the touch control for haptic feedback is known from DE 201 80 024 U1 and the corresponding WO 01/54109 A1 (incorporated by reference), in which the touch control has a touch input device, which has a roughly flat contact surface, operated so that it enters a position signal into a processor of the computer, based on a position on the touch surface that the user touches, during which the position signal indicates the position in two dimensions. The touch control according to WO 01/54109 A1 also has at least one actuator connected to the touch input device, in which the actuator delivers a force to the touch input device, in order to provide a haptic sensation for the user touching the touch surface, in which the actuator delivers the force based on force information sent by the processor directly to the touch input device.

Haptic feedback is also known from U.S. Pat. No. 6,429,846, WO 03/038800 A (incorporated by reference) and WO 03/41046 A1 (incorporated by reference).

An operating element for a device with several selectable menus, functions and/or function values is known from DE 197 31 285 A1, having a surface that can be grasped by the user, and via which selection can be carried out by local movement or contact of the surface. The surface can be varied in its configuration according to the selected and/or selectable menus, function and/or function value.

SUMMARY

The task of the invention is to improve an input device with a touchscreen. It is desirable to devise an input device that is particularly suited for vehicles.

The aforementioned task is solved by an input device, in which the input device includes a display to depict an operating element, a touchscreen arranged above the display for recognition of the position of a touch of an operating surface of the touchscreen, provided especially on a side of the touchscreen facing away from the display, a force sensor connected to the touchscreen to measure a force exerted on the operating surface of the touchscreen and a control to generate a warning during touching of the operating surface of the touchscreen in the region of the display of the operating element or during pressing on the operating surface of the touchscreen in the region of display of the operating element, and to generate a control command assigned to the operating element, especially to control a device operable by means of the input device, if, after generation of the warning, especially in the region of display of the operating element, a force is exerted on the operating surface that surpasses a force limit value.

A warning, generated by the control according to the invention, can be given optically, acoustically or haptically to an operator of the input device. For optical warning, the display can be used. For haptic warning, the touchscreen can be moved.

The display of the operating element can occur by the display of a button.

In one embodiment of the invention, at least two different values of a force exerted on the operating surface can be distinguished by means of the force sensor.

In another embodiment of the invention, the force sensor is configured as a transparent force measurement layer, integrated in the touchscreen or connected to the touchscreen. The force measurement layer then covers an essential part of the display in another embodiment of the invention. In another embodiment of the invention, the force sensor is configured as a force-dependent resistance. Such a force-dependent resistance can be implemented with FSR technology.

In another embodiment of the invention, the input device also includes an actuator to move the touchscreen in at least one direction.

In another embodiment of the invention, input device also includes an essentially U-shaped spring for mechanical connection of the touchscreen to the reference element.

In one embodiment of the invention, the touchscreen can be moved, by means of the control, by operating the actuator to confirm successful operation of the operating element.

In another embodiment of the invention, movement of the touchscreen is dependent on the force exerted on the touchscreen.

The aforementioned task is also solved by a method for operation of an input device, comprising one or more of the aforementioned features with a display to display an operating element and with a touchscreen arranged above the display for recognition of the position of a touch on an operating surface of the touchscreen, in which a warning, during touching of the operating surface of the touchscreen or pressing on the operating surface of the touchscreen, is generated in the region of the display of the operating element, in which a force exerted on the operating surface of the touchscreen is measured, and in which a control command assigned to the operating element is generated, if, after generation of the warning, a force that surpasses a forced limit value is exerted on the operating surface, especially in the region of display of the operating element.

In one embodiment of the invention, the touchscreen is moved for confirmation of successful operation of the operating element.

In another embodiment of the invention, the touchscreen is moved as a function of the force exerted on the touchscreen to confirm successful operation of the operating element. The aforementioned task is also solved by a method for operation of an input device, comprising one or more of the aforementioned features, with a display to display an operating element and with a touchscreen arranged above the display for recognition of the position of touching of an operating surface of the touchscreen, in which a force exerted on the operating surface of the touchscreen is measured, a warning being generated in the region of display of the operating element during pressing on the operating surface of the touchscreen, if a force is exerted on the operating surface that surpasses a force limit value, in which a force exerted on the operating surface of the touchscreen is measured again, and in which a control command assigned to the operating element is generated, if, after generation of the warning, a force that surpasses the second force limit value is exerted on the operating surface, especially in the region of the display of the operating element.

The aforementioned task is also solved by an input device, in which the input device includes the following components:
a display to display an operating element and to display information;
a touchscreen arranged above the display for recognition of the position of a touch of an operating surface of the touchscreen, provided especially on the side of the touchscreen facing away from the display;
a force sensor assigned to the touchscreen to measure a force exerted on the operating surface of the touchscreen and
a control to generate a control command dependent on the force exerted on the operating surface of the touchscreen, especially to control a device operable by the in device and/or to generate a display control signal, dependent on the force exerted on the operating surface of the touchscreen to display said information that can be displayed on the display.

In another embodiment of the invention, at least two different values of a force exerted on the operating surface can be distinguished by means of the force sensor.

In another embodiment of the invention, the force sensor is configured as a transparent force measurement layer, integrated in the touchscreen or connected to the touchscreen. The force measurement layer then covers an essential part of the display in another embodiment of the invention. In another embodiment of the invention, the force sensor is configured as a force-dependent resistance.

The aforementioned task is also solved by a method for operation of an input device, comprising especially one or more of the aforementioned features, with a display to display an operating element and to display information, and with a touchscreen arranged above the display for recognition of the position of a touch of an operating surface of the touchscreen, provided especially on the side of the touchscreen facing away from the display, in which a force exerted on the operating surface of the touchscreen is measured, and in which a control command, dependent on the force exerted on the operating surface of the touchscreen, especially to control a device operable by means of the input device, and/or a display control signal, dependent on the force exerted on the operating surface of the touchscreen, is generated to display said information, displayable on the display.

The aforementioned task is also solved by an input device, in which the input device comprises the following components:
a touchscreen for recognition of the position of a touch of an operating surface of the touchscreen,
a force sensor assigned to the touchscreen to measure a force exerted on the operating surface of the touchscreen,
an actuator to move the touchscreen in at least one direction, and
a control to move the touchscreen by driving the actuator, in which the degree of movement of the touchscreen is dependent on the force exerted on the touchscreen.

In one embodiment of the invention, the input device also includes a display arranged on a side of the touchscreen facing away from the operating surface of the touchscreen.

In another embodiment of the invention, at least two different values of a force exerted on the operating surface can be distinguished by means of the force sensor.

In another embodiment of the invention, the force sensor is configured as a transparent force measurement layer, integrated in the touchscreen or connected to the touchscreen. In another embodiment of the invention, the force sensor is configured as a force-dependent resistance.

The aforementioned task is also solved by a method for operation of an input device, especially comprising one or more of the aforementioned features, with a touchscreen for recognition of a position of a touch of an operating surface of the touchscreen, in which a force exerted on the operating surface of the touchscreen is measured, the touchscreen being moved and the movement or degree of movement of the touchscreen being dependent on the force exerted on the touchscreen.

Movement of the touchscreen can be dependent on the force exerted on the touchscreen, so that the touchscreen is moved when the force exerted on the operating surface of the touchscreen is greater than a first force limit value. Movement of the touchscreen can be dependent on the force exerted on the touchscreen, so that the touchscreen is moved again when the force exerted on the operating surface of the touchscreen is greater than a second force limit value, the second force limit value being greater than the first force limit value.

The aforementioned task is also solved by an input device, in which the input device has the following components:
- a display for display of an operating element;
- a touchscreen arranged above the display for recognition of the position of a touch of an operating surface of the touchscreen, provided especially on an side of the touchscreen facing away from the display;
- a force sensor connected to the touchscreen to measure a force exerted on the operating surface of the touchscreen;
- an actuator to move the touchscreen in at least one direction and a control for operation of the actuator,
- so that, by movement of the touchscreen in the direction parallel to the operating surface, a surface structure of the operating surface can be felt, if the operating surface is touched in a position prescribed for a structure and a force is exerted on the operating surface that is greater than the first force limit value, and that
- the touchscreen is moved in a direction parallel to the operating surface, if the operating surface is touched at a position, at which an operating element is displayed by the display, and if a force is exerted on the operating surface that is greater than a second force limit value.

It can be prescribed that the first force limit value essentially includes 0 N.

In one embodiment of the invention, at least two different values of a force exerted on the operating surface can be distinguished by the force sensor.

In another embodiment of the invention, the force sensor is configured as a transparent force measurement layer, integrated in the touchscreen or connected to the touchscreen. The force measurement layer then covers an essential part of the display in another embodiment of the invention. In another embodiment of the invention, the force sensor is configured as a force-dependent resistance.

A force can be continuously measured by means of a force sensor according to the invention, or measured in two, three or more steps.

The aforementioned task is also solved by a vehicle with one of the aforementioned input devices. The vehicle according to the invention is then a land vehicle, individually usable in traffic. The vehicles according to the invention are not particularly restricted to land vehicles with internal combustion engines.

Additional advantages and details are apparent from the following description of practical examples, in which the same reference number is referred to the same or equivalent elements.

DETAILED DESCRIPTION

Figure 1:
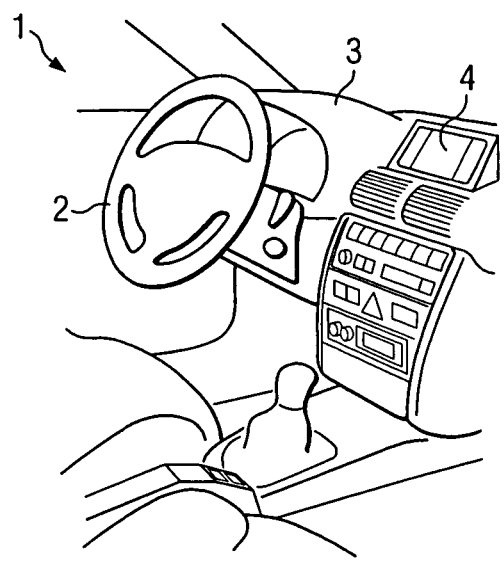
FIG. 1 shows a practical example of a cockpit of a vehicle.
Figure 2:
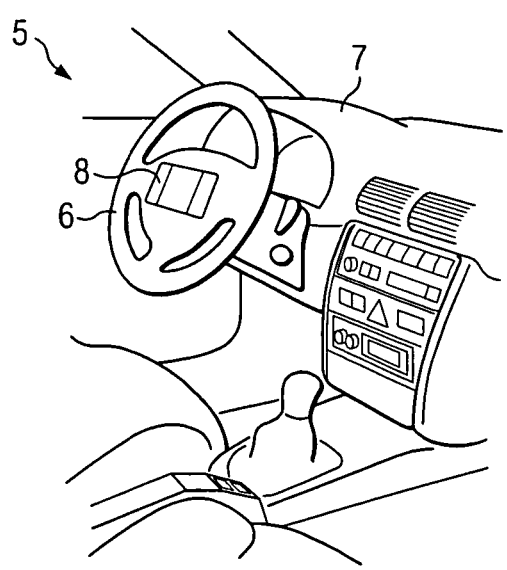
FIG. 2 shows another practical example for a cockpit of a vehicle.

FIG. 1 shows a practical example for a cockpit 1 of a vehicle. Steering wheel 2 is arranged in cockpit 1 beneath a dashboard 3. The dashboard 3 has an input device 4 arranged next to steering wheel 2. FIG. 2 shows an alternative practical example for a cockpit 5 of a vehicle, in which a steering wheel 6 is also arranged beneath the dashboard 7. However, deviating from the practical example according to FIG. 1, an input device 8 is arranged in steering wheel 6.

Figure 3:
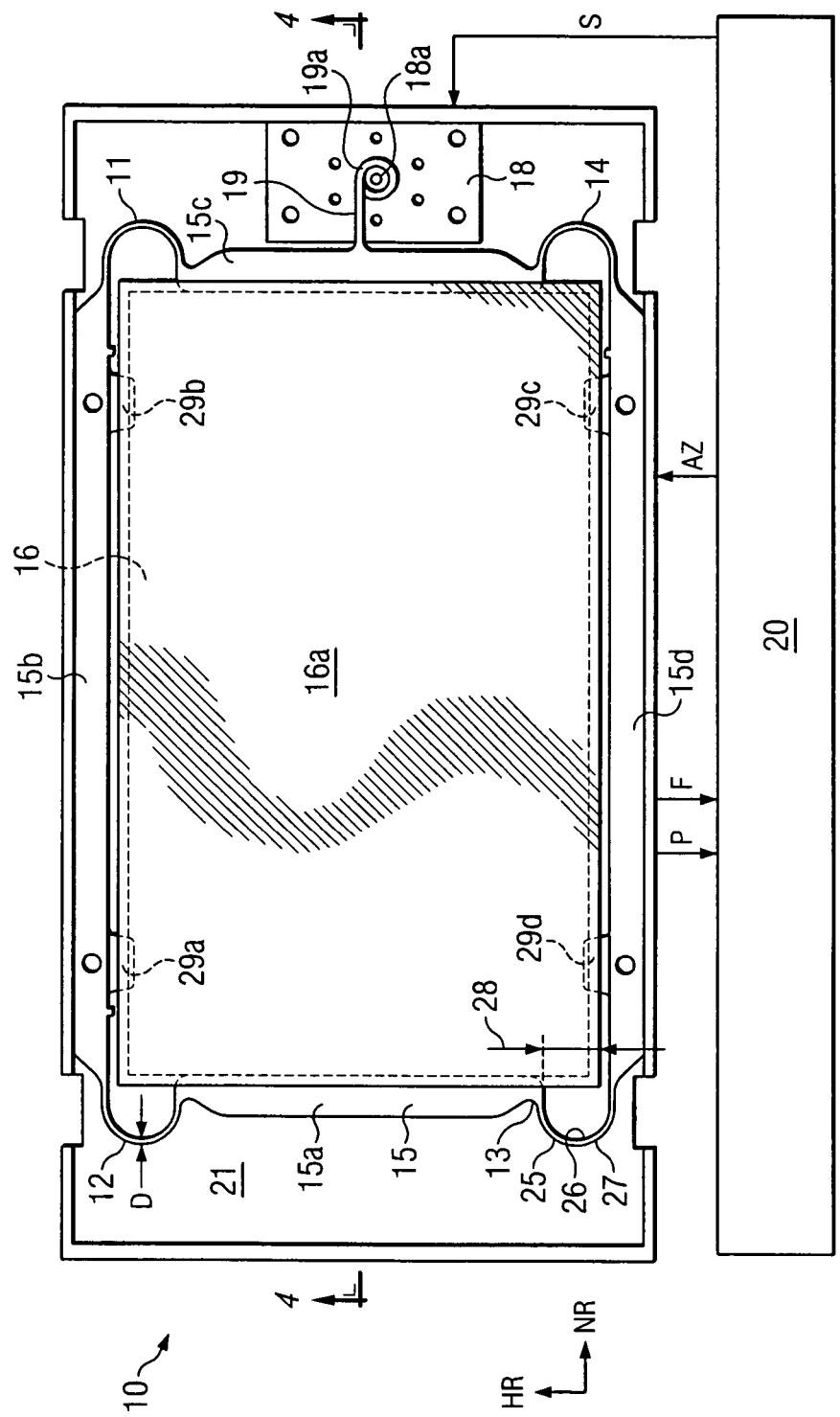
FIG. 3 shows a practical example of an input device.
Figure 4:
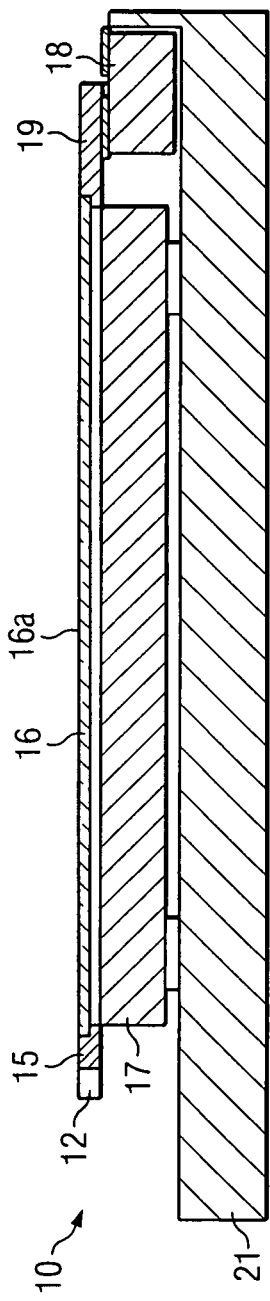
FIG. 4 shows a cross section of the input device along line A-A according to FIG. 3.
Figure 5:
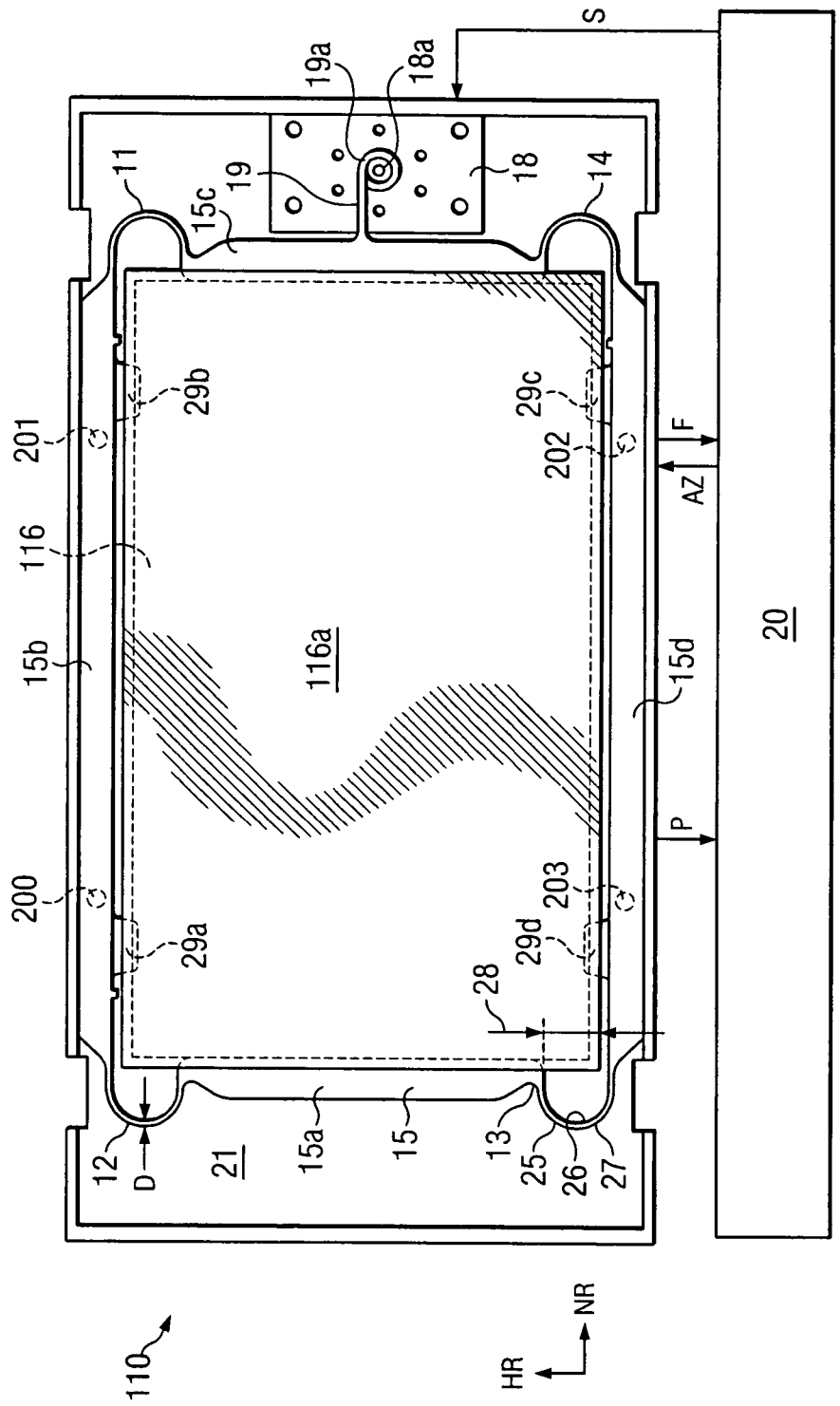
FIG. 5 shows another practical example of the input device.

FIG. 3 shows, as a possible practical example of an input device 4 or 8, an input device 10 for optical display of information and input of commands in a top view. FIG. 4 shows a cross section of the input device 10 along line A-A according to FIG. 3. The input device 10 has a transparent touchscreen 16 arranged above a display 17 with an operating surface 16A. FIG. 5 shows, as a possible further practical example of an input device 4 or 8, another input device 110 for optical display of information and for input of commands in a top view. The input device 110 has a transparent touchscreen 116 arranged above a display 17 with an operating surface 116A. The display 17 of the input device 10 or the input device 110 is connected to a reference element 21 by means of mounts 29A, 29B, 29C and 29D. The reference element 21 can be part of the dashboard 3 or steering wheel 6.

The touchscreen 16 and 116 is secured by means of a frame 15. Frame 15 has four U-shaped springs 11, 12, 13, 14, which are connected to each other by connection elements 15A, 15B, 15C and 15D. The frame 15 is a cast part made of plastic, i.e., the U-shaped springs 11, 12, 13, 14 are cast from one piece of plastic together with the connection elements 15A, 15B, 15C and 15D. Such a plastic can be polycarbonate, ABS, acetal or polyethylene. Particularly suitable U-shaped springs can be made from acetal.

The frame is glued to the connection elements 15A and 15C with the touchscreen 16 and 116. In an alternative or additional embodiment, the touchscreen 16 or 116 is secured in the frame by a bias in U-shaped springs 11, 12, 13, 14.

The frame 15 has a (flexible) connection piece 19, connected to the connection element 15C. The connection piece 19 has a distortion 19A that includes an eccentric drive shaft pin 18A of an actuator designed as an electric motor. The rotational movement of the actuator 18 is converted to a translational movement. Actuator 18 is configured as a DC (brush) motor. However, other embodiments are also usable in conjunction with a different connection to frame 15, for example, piezoactuators or so-called voice coils.

The U-shaped springs 11, 12, 13, 14 each have two spring arms 25 and 27, an opening 28 arranged between the two spring arms 25 and 27 and a connection point 26, to which the two spring arms 25 and 27 are connected. The U-shaped springs 11, 12, 13, 14 have a main spring constant, essentially parallel to opening 28, and a secondary spring constant, essentially perpendicular to opening 28, in which the secondary spring constant is at least four times the main spring constant. In the present practical example, the main spring constant refers to a direction designated the direction HR in FIG. 3, and the secondary spring constant pertains to a direction designated secondary direction NR in FIG. 3. The main direction HR and the secondary direction NR are orthogonal to each other, but parallel to operating surface 16A or 116A.

The U-shaped springs 11, 12, 13, 14 have a thickness D from 0.5 mm to 2 mm, in the present practical example 0.8 mm. The width of opening 28 is between 5 mm and 30 mm. The specific width of opening 28 is chosen as a function of the material, so that the desired main spring constant is achieved. The main spring constant is then adjusted to a weight of the touchscreen 16 or 116, so that the touchscreen 16 or 116, in conjunction with U-shaped springs 11, 12, 13, 14, has a mechanical natural frequency from 5 Hz to 150 Hz, especially a natural frequency from 30 Hz to 75 Hz. In the present practical example, it is prescribed that the natural frequency is 55 Hz. Natural frequency according to the invention is the smallest mechanical resonance frequency of the system of U-shaped springs 11, 12, 13, 14 and touchscreen 16 or 116.

The term U-shaped springs should be understood to be broadly worded. U-shaped springs according to the invention therefore include springs having two spring arms.

The touchscreen 16 or 116 and display 17, according to FIG. 3 and FIG. 4 or according to FIG. 5, are connected, in terms of data, to a control 20, from which a display control signal AZ is sent to display 17 with information to be displayed on display 17. The control 20 receives a signal P from the touchscreen 16 or 116, stating where a user of the touchscreen 16 or 116 is touching the touchscreen 16 or 116.

The touchscreen 16 includes a transparent force measurement layer, integrated in the touchscreen or connected to the touchscreen (in the cross sectional view according to FIG. 4, not shown) for measurement of a force exerted on the operating surface 16A of touchscreen 16. One embodiment of a suitable touchscreen 16 is offered, for example, as a Dual-Force touchscreen from the CyperTouch Company (cf. www-.cybertouch.com/DUALFORCE.html). The output signal of the force measurement layer, i.e., the force exerted on the touchscreen 16 or the operating surface 16A of the touchscreen 16, is designated with reference letter F in FIG. 3. The DualForce touchscreen of the CyberTouch Company can distinguish between a slight touch of touchscreen 16 and pressing on touchscreen 16. In one embodiment of the input device 10, it is prescribed that an input does not occur by simple touching of touchscreen 16, but by pressing on touchscreen 16. In this case, pressing on touchscreen 16 at a site indicated as operating element thus leads to operation of the touchscreen 16, but not simple touching of the touchscreen 16 by an operator at a site indicated as operating element. The latter is a particularly suitable procedure for use in vehicles.

The input device 110 includes force sensor 200, 201, 202 and 203 connected to the touchscreen 116 for measurement of a force exerted on the operating surface 116A of touchscreen 116. The force sensors 200, 201, 202 and 203 can be configured as force-dependent resistance. Such force-dependent resistances can be implemented by FSR technology. Four sensors 200, 201, 202 and 203 configured in this way permit essentially continuous measurement of a force exerted on the operating surface 116A of the touchscreen 116. However, it can also be prescribed, by means of control 20, to distinguish only between two states during such implementation, namely, a light touch of touchscreen 116, and pressing on touchscreen 116, or only between three states. In this case, it is also prescribed that an input does not already occur by simple touching of touchscreen 116, but by (light) pressing on touchscreen 116 or its operating surface 116A.

Figure 7:
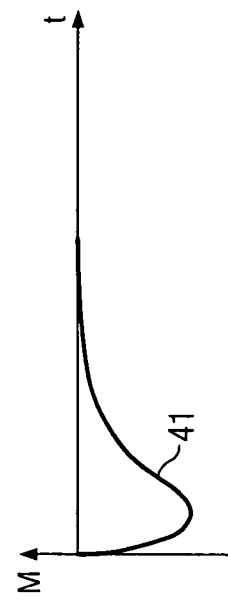
FIG. 7 shows a movement of the touchscreen in a direction essentially parallel to the touchscreen.
Figure 6:
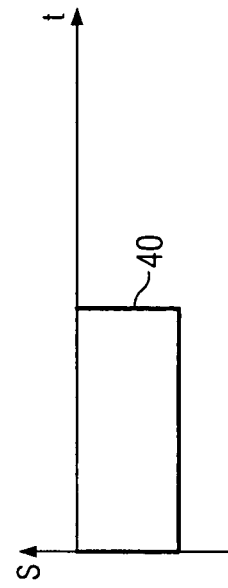
FIG. 6 shows a simple control signal.

As confirmation of such an input (a command), the control 20 generates a control signal S, lasting at least 50 ms, by means of which the actuator 18 is briefly moved. The individual components of the input device are then dimensioned, so that the touchscreen 16 or 116 is deflected less than 1 mm. A control signal S can be, for example, a simple jump function 40 (depicted in FIG. 6 via time t) or a control signal to generate more complex movement. FIG. 7 shows a practical example of a movement 41 of touchscreen 16 or 116 as confirmation of input by means of touchscreen 16 or 116 via time t. M then denotes the deflection of the touchscreen 16 or 116 in a direction parallel to touchscreen 16 or 116, in which M is less than 1 mm. The deflection of touchscreen 16 or 116 occurs for a period between 50 ms and 800 ms, especially for a period between 100 ms and 400 ms. It has been shown that some subjects prefer a movement of the touchscreen 16 or 116 induced by a jump function.

Figure 8:
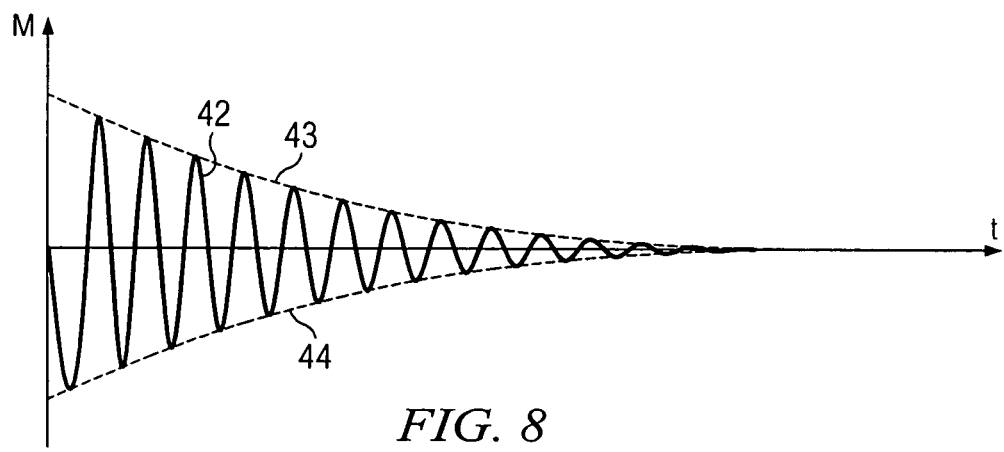
FIG. 8 shows a movement of the touchscreen in a direction essentially parallel to the touchscreen.
Figure 9:
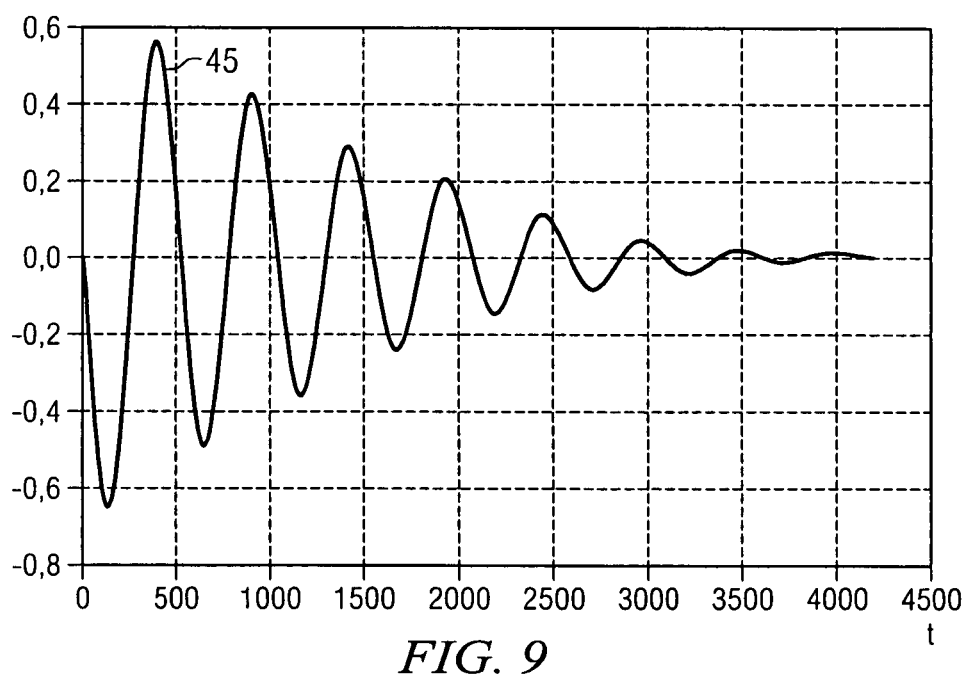
FIG. 9 shows another control signal.

In an embodiment preferred by other subjects, the touchscreen 16 or 116 can be moved with a diminishing oscillation 42 in a direction parallel to touchscreen 16 or 116, for confirmation of the command input by means of touchscreen 16 or 116, as shown in FIG. 8 as deflection M of touchscreen 16 or 116 over time t. The diminishing oscillation 42 has an envelope curve 43 or 44 with an exponential fraction. The envelope curve 43 or 44 then has a term $t^a$ or a term $b^t$, in which a and b are variables. The envelope curve 43 or 44 can then be a function of $a1+a2\ t^{a3}$ or $b1+b2^t$, in which a1, a2, a3, b1 and b2 are variables. In addition, the diminishing oscillation 42 has a frequency between 5 Hz and 80 Hz. FIG. 9 shows another control signal 45 for movement of the touchscreen 16 or 116 in a direction essentially parallel to touchscreen 16 or 116 over time 6 at scanning points, in which a scanning interval amounts to 51.2 µs. The control signal 45 is shown normalized to its highest value. It has a frequency of 38 38.1 Hz and has decayed after 210 ms, in which the decay occurs according to a quadratic relation. An appropriate quadratic relation for the upper envelope curve HO, is, for example $$HO(t) = \begin{cases} 0,8 - \dfrac{1,6 \cdot t}{210 \text{ ms}} + \dfrac{0,8 \cdot t^2}{(210 \text{ ms})^2}; & \text{for } 0 \le t \le 210 \text{ ms} \\ 0; & \text{for } 210 \text{ ms} \le t \end{cases}$$

An appropriate quadratic relation for the lower envelope curve, HU, is, for example $$HU(t) = \begin{cases} -0,8 + \dfrac{1,6 \cdot t}{210 \text{ ms}} - \dfrac{0,8 \cdot t^2}{(210 \text{ ms})^2}; & \text{for } 0 \le t \le 210 \text{ ms} \\ 0; & \text{for } 210 \text{ ms} \le t \end{cases}$$

In another embodiment, it is proposed that the degree of movement of touchscreen 16 or 116 for confirmation of the command entered by the touchscreen 16 or 116 is dependent on the force F exerted on the touchscreen 16 or 116 on the operating surface 16A or 116A of touchscreen 16 or 116. In this case, it is prescribed, in particular, that the amplitude and/or frequency of an oscillation for confirmation of the command entered by means of touchscreen 16 or 116 is dependent on the force exerted on the touchscreen 16 or 116 or the operating surface 16A or 116 of touchscreen 16 or 116. For example, it can be prescribed that the envelope curve of the oscillation according to FIG. 9 is dependent on the force exerted on the touchscreen 16 or 116 or the operating surface 16A or 116A of the touchscreen 16 or 116. An appropriate relation for the upper envelope curve HO is then $$HO(t) = \begin{cases} g(F) \cdot \left(0, 8 - \frac{1, 6 \cdot t}{210 \text{ ms}} + \frac{0, 8 \cdot t^2}{(210 \text{ ms})^2}\right); & \text{for } 0 \leq t \leq 210 \text{ ms} \\ 0; & \text{for } 210 \text{ ms} \leq t \end{cases}$$

An appropriate relation for the lower envelope curve HU is, accordingly, $$HU(t) = \begin{cases} g(F) \cdot \left(-0, 8 + \frac{1, 6 \cdot t}{210 \text{ ms}} - \frac{0, 8 \cdot t^2}{(210 \text{ ms})^2}\right); & \text{for } 0 \leq t \leq 210 \text{ ms} \\ 0; & \text{for } 210 \text{ ms} \leq t \end{cases}$$

g(F) is a force F of increasing value exerted on the touchscreen 16 or 116 or the operating surface 16A or 116A of the touchscreen 16 or 116, which equals zero as long as the force F exerted on the touchscreen 16 or 116 or the operating surface 16A or 116A of the touchscreen 16 or 116 is less than a limit value, and which it is a maximum of 1.

Figure 10:
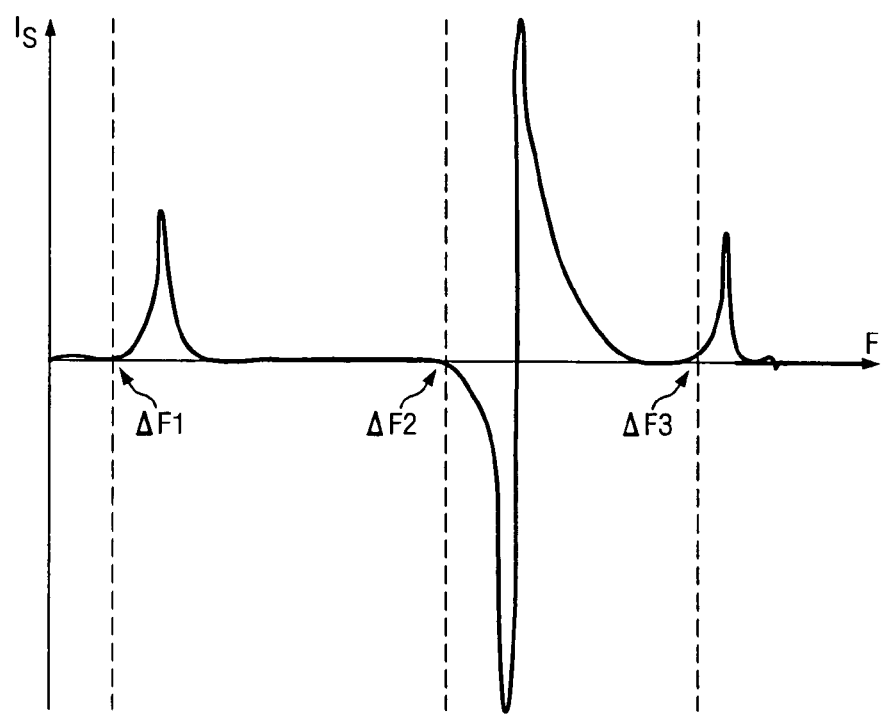
FIG. 10 shows another control signal.

FIG. 10 shows a particularly suitable control signal or its electrical current is for control of the actuator 18 for the movement of touchscreen 16 or 116, dependent on the force F exerted on the touchscreen 16 or 116 or on operating surface 16A or 116A of the touchscreen 16 or 116, especially to confirm a command entered by means of touchscreen 16 or 116. ΔF1 then denotes a first force limit value, ΔF2 a second force limit value and ΔF3 a third force limit value. The first force limit value in the embodiment of the example is 100 mN, the second force limit value in the example is 1 N and the third force limit value in the example is 1.5 mN.

Figure 11:
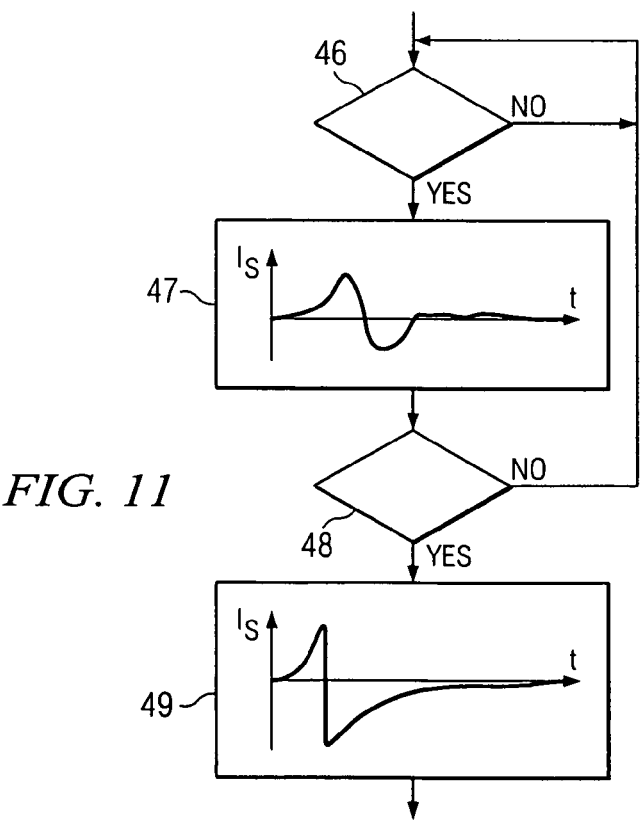
FIG. 11 shows a method for generation of another control signal.

FIG. 11 shows a method for generation of an additional, particularly preferred control signal for movement of touchscreen 16 or 116, dependent on the force F exerted on the touchscreen 16 or 116 or on the operating surface 16A or 116A of the touchscreen 16 or 116, and its electrical current is for corresponding control of actuator 18. The method begins with a query 46 whether the force F exerted on the touchscreen 16 or 116 or on the operating surface 16A or 116A of touchscreen 16 or 116 is greater than a first force limit value—in the example 100 mN. If the force F exerted on the touchscreen 16 or 116 or operating surface 16A or 116A of the touchscreen 16 or 116 is greater than the first force limit value, the query 46 is followed by step 47, in which the actuator 18 is operated for 200 ms by means of control 20, according to the control signal S assigned to step 47, in which is denotes the electrical current of the control signal.

Step 47 is followed by a query 48, whether the force F exerted on the touchscreen 16 or 116 or on the operating surface 16A or 116A of the touchscreen 16 or 116 is greater than a second force limit value—in the example 1 N. If the force exerted on the touchscreen 16 or 116 or on the operating surface 16A or 116A of the touchscreen 16 or 116 is greater than the first force limit value, query 48 is followed by a step 49, in which the actuator 18 is controlled for 200 ms, by means of the control 20, according to the control signal S formed in step 49, in which Is denotes the electrical current of the control signal S.

It can also be prescribed, for certain regions of touchscreen 16 or 116, for example, those lying above operating elements and/or elements of a map, depicted by means of display 17—during touching of touchscreen 16 or 116 or its operating surface 16A or 116 and/or during slight pressing of touchscreen 16 or 116 or on its operating surface 16A or 116A, to simulate a relief structure of the touchscreen 16 or 116 or its operating surface 16A or 116A. In this case, the control therefore generates, during simple touching of touchscreen 16 or 116 or its operating surface 16A or 116A by an operator, on a site, indicated as an operating element and/or as an element of a map, a slight oscillation that lasts during touching of touchscreen 16 or 116 or its operating surface 16A or 116A. An appropriate oscillation has an amplitude of 0.2 mm and a frequency of 38.1 Hz. During stronger pressing on touchscreen 16 or 116 or on its operating surface 16A or 116A, on the other hand, operation of the depicted operating element and haptic feedback, explained with reference to FIG. 9, occurs.

As an alternative or in addition, it could be prescribed, when touchscreen 16 or 116 or its operating surface 16A of 116A is touched and/or during slight pressure on touchscreen 16 or 116 or its operating surface 16A or 116A, at the boundary of a region prescribed for a relief-like structure, a movement of the touchscreen 16 or 116 is produced. This movement of touchscreen 16 or 116, in particular, is stronger than a movement of the touchscreen 16 or 116 during contact of touchscreen 16 or 116 or its operating surface 16A or 116A and/or during slight pressure on the touchscreen 16 or 116 or its operating surface 16A or 116A within a region prescribed for a relief-like structure.

As an alternative or in addition, it can be prescribed, during touching of touchscreen 16 or 116 of its operating surface 16A or 116A and/or during slight pressure on the touchscreen 16 or 116 or its operating surface 16A or 116A within a region prescribed for a relief-like structure, to move the touchscreen 16 or 116 as a function of a speed of a movement over the touchscreen 16 or 116 or its operating surface 16A or 116A. The speed of movement over the touchscreen 16 or 116 or its operating surface 16A or 116A can be determined from signal P by means of a Kalman filter. Details concerning Kalman filters can be gathered from the book "Optimum Systems Control", pages 191 to 261 (incorporated by reference).

The input devices 4 and 8, configured according to input device 10 or 110, in an advantageous embodiment, can replace a display and operating device, disclosed in WO 00/21795 (incorporated by reference), while retaining its menu-guided functionality. FIG. 12, FIG. 13, FIG. 14, FIG. 15, FIG. 16, FIG. 17 and FIG. 18 show different masks that can be displayed by an input device 10 or 110.

Figure 12:
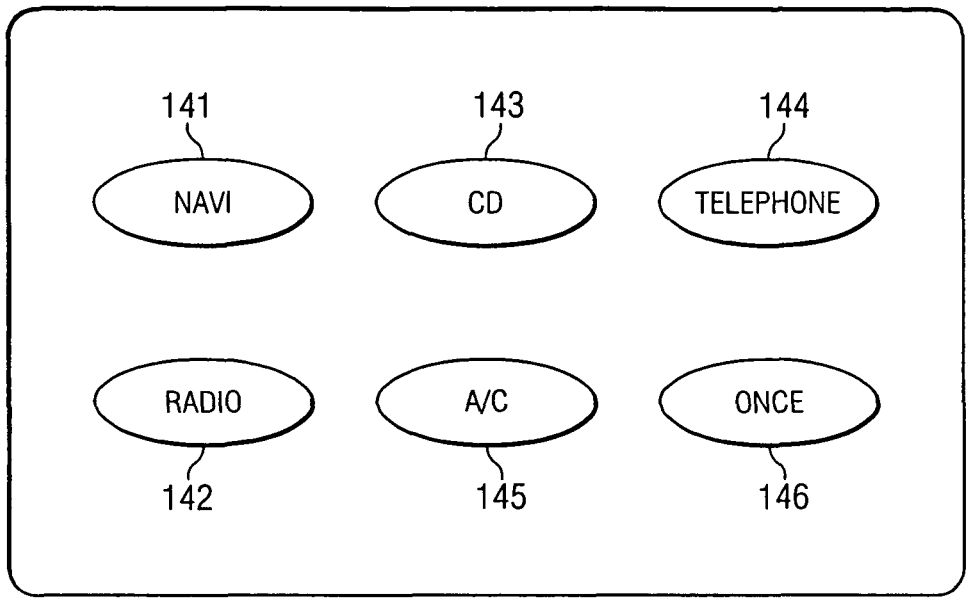
FIG. 12 shows a practical example for a base mask display with an input device.

The input device 10 or 110 in FIG. 12 is shown with a base mask. The input device 10 or 110 then represents six operating elements 141, 142, 143, 144, 145 and 146, executed by ellipsis. By pressing on the operating element 142 in FIG. 12, a mask for operation of a radio, is called up and by pressing operating element 143 in FIG. 12, a mask for operation of a CD player is called up.

Figure 13:
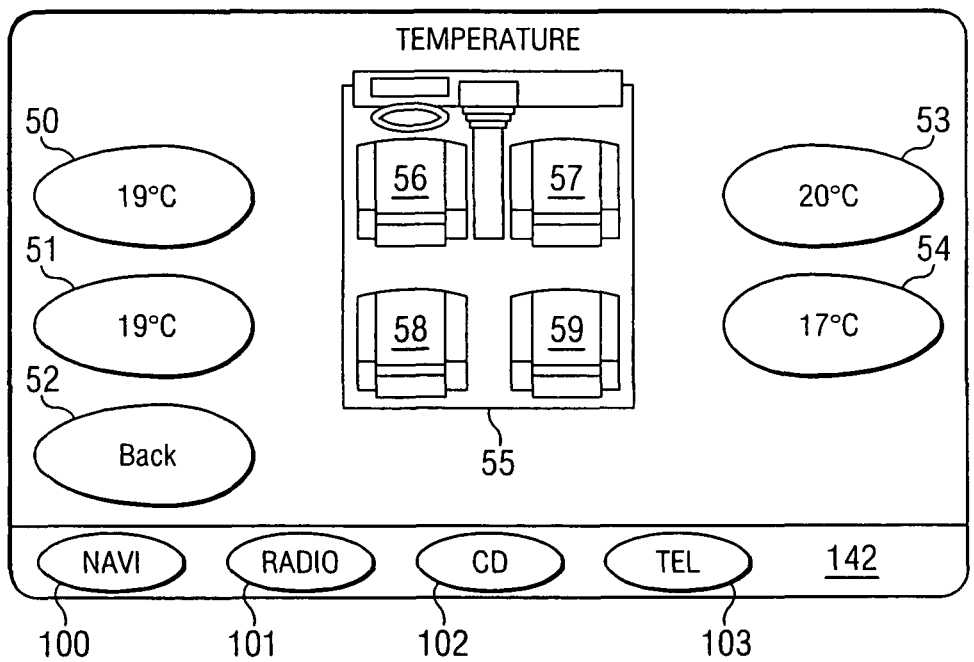
FIG. 13 shows a practical example for a mask for operation of an air conditioner.

By pressing the operating element 145 in FIG. 12, a mask for operation of an air conditioner is called up in FIG. 13. Temperature information of individual locations in the vehicle interior, together with operating elements 50, 51, 52, 53 and 54, are displayed in the mask depicted in FIG. 13, in which the temperature information refers to actually set temperatures that can be changed via operating elements 50, 51, 53 and 54.

The depiction according to FIG. 13, with the heading "TEMPERATURE" and the display of internal space 55 of a vehicle, makes it clear that the temperature in the vehicle interior can be adjusted individually and according to seat location. The operating element 50 shows, for the front vehicle driver seat 56, that a temperature of 19° C. is set. The operating element 53 shows, for the front passenger seat 57, that a temperature of 20° C. is set. For the rear seats 58 and 59, 19° C. is set on the left side and 17° C. on the right. The operating element 52 has an allocation, i.e., a function allocation, shown in the display field with "back" (to the next higher menu display, i.e., in the present case, to the mask according to FIG. 12).

Figure 14:
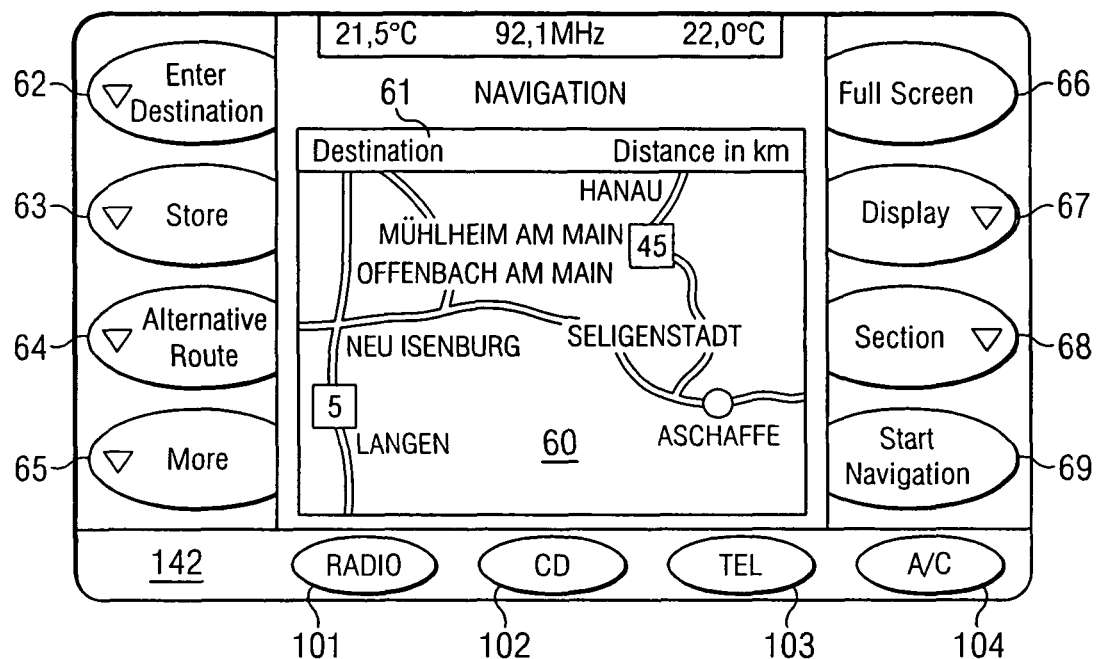
FIG. 14 shows a practical example for a mask for operation of a navigation system.

By pressing the operating element 141 in FIG. 12, a mask, shown in FIG. 14 for operation of a navigation system is called up. The mask shows a section of a street map 60 of the instantaneous vehicle location, as well as the destination and distance to the destination, above the street map 60 in a field 61. Operating elements 62, 63, 64, 65, 67 and 68 are also shown, by means of which submasks can be called up by pressing. An operating element 66 is also shown for display a full image, and an operating element 69 for starting a guiding routine. With reference to the details of the menu, WO 00/21795 is referred to, in which the operating element 62, 63, 64, 65, 66, 67, 68 and 69 replace the operating elements 3a, 3b, 3c, 3d, 3e, 3f, 3g and 3h, disclosed in WO 00/21795.

Figure 15:
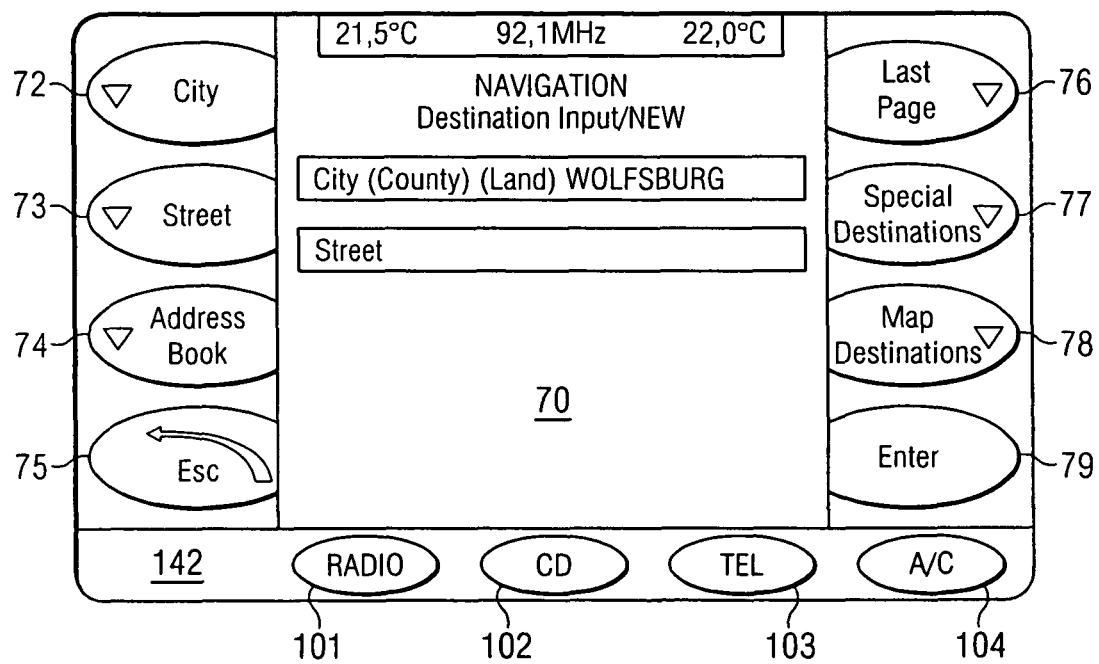
FIG. 15 shows a practical example for a submask for operation of a navigation system.

By pressing the operating element 62 in FIG. 14, a submask according to FIG. 15 is called up, which shows the trip destination in a field 70. By means of the submask according to FIG. 15, operating elements 72, 73, 74, 75, 76, 77, 78 and 79 are also shown. With reference to details of the menu, WO 00/21795 is also referred to, in which the operating elements 72, 73, 74, 75, 76, 77, 78 and 79 shown on the display replace with the operating elements 3a, 3b, 3c, 3d, 3e, 3f, 3g and 3h, disclosed in WO 00/21795.

Figure 16:
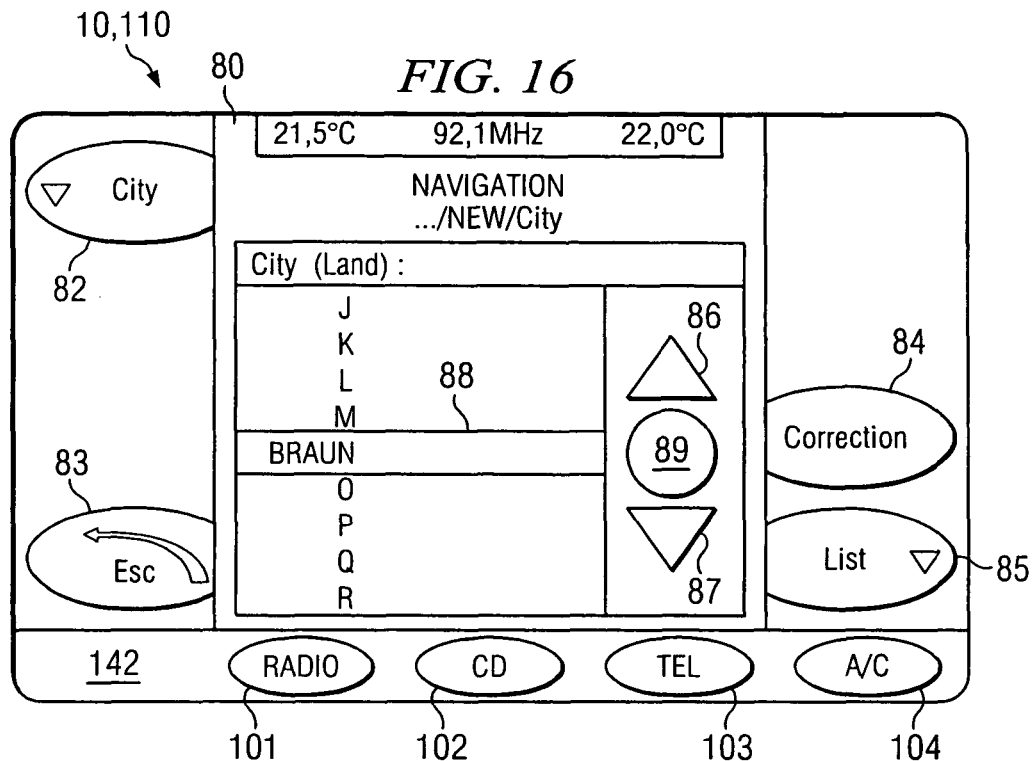
FIG. 16 shows a practical example for another submask for operation of a navigation system.

By pressing the operating elements 72 in FIG. 15, a submask according to FIG. 16 is called up, which shows the destination to be entered in a field 80. By means of the submask according to FIG. 16, operating elements 82, 83, 84 and 85 are also shown, which replace the operating elements 3a, 3d, 3g and 3h, disclosed in WO 00/21795. A letter selection line 88, as well as operating elements 86, 87 and 89, are shown in field 80. The letter selection line 88 can be moved upward or downward by pressing the operating elements 86 and 87. By pressing the operating element 89, a marked letter can be chosen. It is prescribed in a an advantageous embodiment that the control 20, during pressing on operating element 86 or 87, generates a display control signal dependent on the force F exerted on the operating surface 16A or 116A of touchscreen 16 or 116, so that the speed of movement of the letter selection line 88 is dependent on the force F exerted on the operating surface 16A or 116A of the touchscreen 16 or 116. By means of control 20, a control command for a navigation system for corresponding rapid selection of letters, dependent on the force F exerted on the operating 16A or 116A of touchscreen 16 or 116, is also generated. In similar fashion to the operating elements 86 or 87 configured in this way, a volume control or transmitter selection can be implemented, in which the speed of volume control or transmitter selection is dependent on the force F exerted on the operating surface 16A or 116A of touchscreen 16 or 116.

Figure 17:
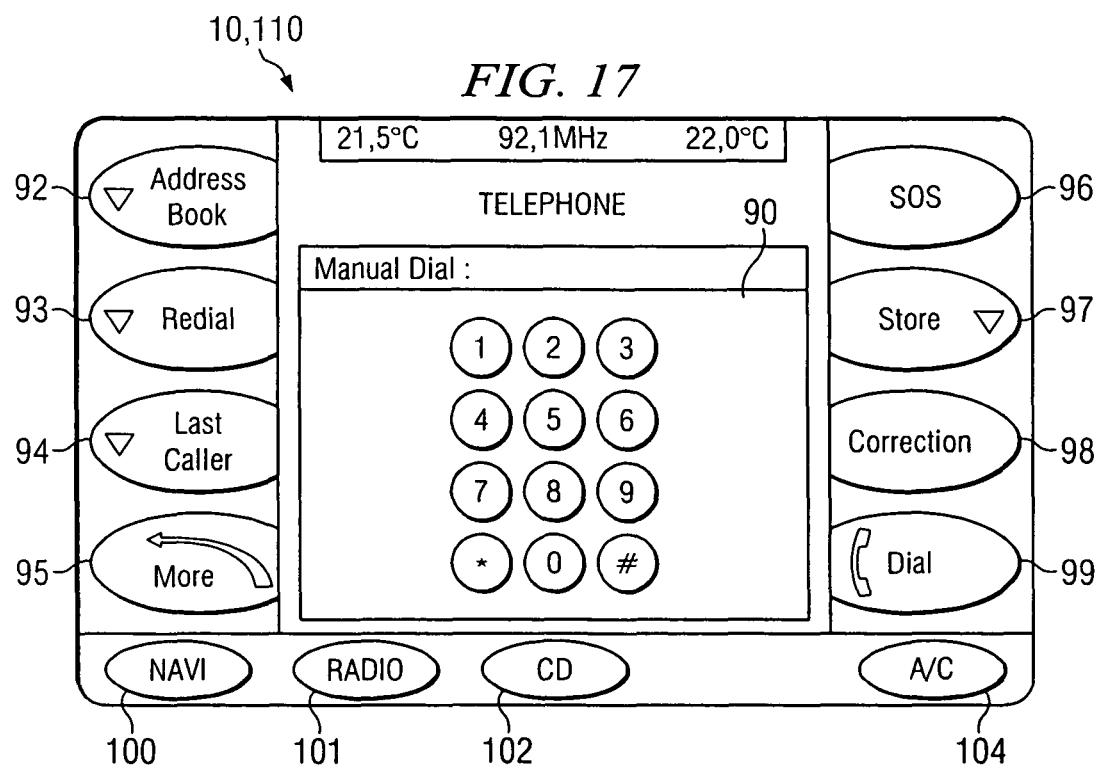
FIG. 17 shows a practical example for a mask for operation of a telephone.

By pressing operating element 144 in FIG. 12, a mask shown in FIG. 17 for operation of a telephone is called up, which shows selection keys for a telephone in a field 90. By means of the submask according to FIG. 17, operating elements 92, 93, 94, 95, 96, 97, 98 and 99 are also shown, which replace the operating elements 3a, 3b, 3c, 3d, 3e, 3f, 3g and 3h disclosed in WO 00/21795. The selection keys for a telephone, shown in field 90, are configured as operating elements, by means of which a telephone number can be dialed.

In the masks and submasks according to FIG. 13, FIG. 14, FIG. 15, FIG. 16 and FIG. 17, operating elements 100, 101, 102, 103 and 104 are also shown, which correspond to the operating elements 141, 142, 143, 144 and 145.

By means of operating elements 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99, 100, 101, 102, 103, 104, 141, 142, 143, 144 and 145, a haptic feedback is generated. For this purpose, the touchscreen of the input device 10 or 110 is then moved in a manner described with reference to FIG. 3, FIG. 4, FIG. 5, FIG. 6, FIG. 7, FIG. 8 or FIG. 9, if a user input has occurred by pressing the corresponding operating element 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99, 100, 101, 102, 103 104, 141, 142, 143, 144 and 145, i.e., when touching occurred long enough and/or sufficient pressure was exerted on the touchscreen. This is particularly advantageous for use in a vehicle, since an operator, i.e., the driver of a vehicle, receives a confirmation of his input in this way without having to look at the display. In this manner, safety during driving is increased.

Figure 18:
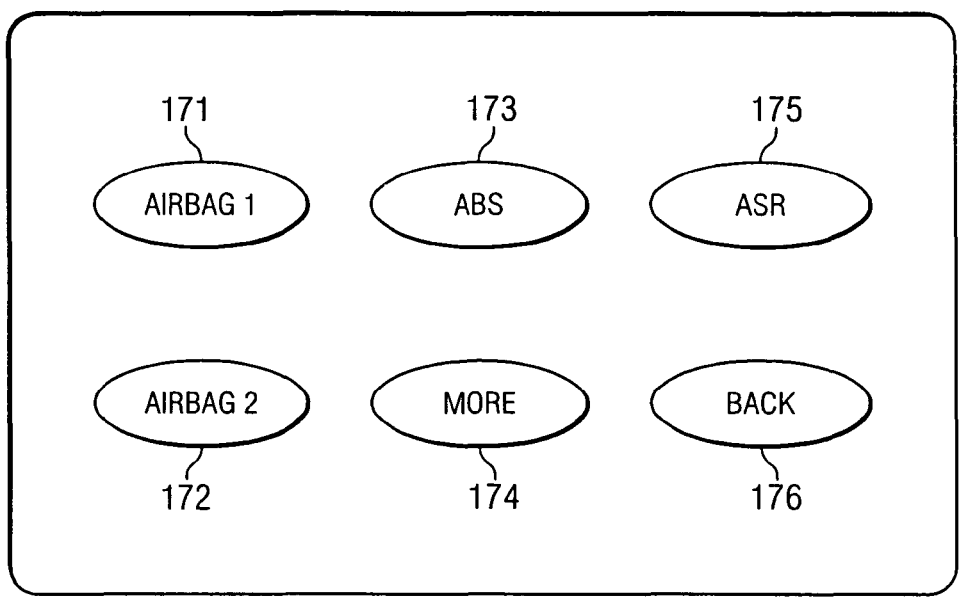
FIG. 18 shows a practical example for a mask for changing adjustment.

By pressing the operating element 146 in FIG. 12, a mask, depicted in FIG. 18, for engagement or disengagement of a airbag, denoted airbag 1, by means of an operating element, denoted with reference number 171, for engagement or disengagement of an airbag, designated airbag 2, by means of an operating element, denoted with reference number 172, for engagement or disengagement of an anti-blocking system by means of an operating element, designed with reference number 173, and for engagement or disengagement of an anti-slip control by means of an operating element, designated with reference number 175, are called up. By means of an operating element, denoted with reference number 174, additional submasks can be called up and, by operating an operating element, designed with reference number 176, return to the mask, depicted in FIG. 12, is possible.

Figure 19:
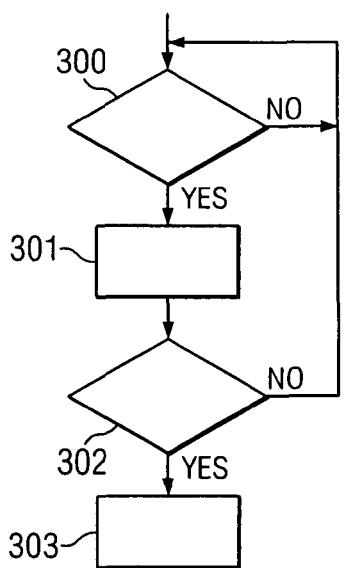
FIG. 19 shows a practical example for generation of a warning.

With reference to the operating elements 171 and 172, a process, depicted in FIG. 19, is implemented in control 20. The process begins with query 300, whether a force that surpasses a first force limit value is exerted on the operating surface 16A or 116A of touchscreen 16 or 116 in the region of display of the operating element 171 or operating element 172. If a force F is exerted on the operating surface 16A or 116A of touchscreen 16 or 116 in the region of display of operating element 171 or operating element 172, which exceeds a first force limit value, query 300 is followed by a step 301, in which an optical, acoustic and/or haptic warning is generated. The display 17 can be operated by control 20 for optical warning, so that the corresponding operating element 171 or 172 blinks and/or is made red. For haptic warning, the touchscreen 16 or 116 can be moved, as for an input confirmation (cf., for example, FIG. 9). In addition, it can be prescribed to wait for a specified time, for example, 1 s, in step 301.

Step 301 is followed by a query 302, whether a force F that exceeds a second force limit value is exerted on the operating surface 16A or 116A of the touchscreen 16 or 116 in the region of the display of operating element 171 or operating element 172, in which the second force limit value can be greater than or equal to the first force limit value. If a force F is exerted on the operating surface 16A or 116A of touchscreen 16 or 116 in the region of display of operating element 171 or operating element 172, query 302 is followed by a step 303 with an input confirmation (cf., for example, FIG. 9) and execution of the action corresponding to a function of the operating element 171 or 172. In the present practical example, the airbag, designated AIRBAG 1 (in the case of operating element 172), or the airbag, designated AIRBAG 2 (in the case of operating element 172) is switched on or switched off. A corresponding procedure could also be provided with reference to switching off of an anti-blocking system or anti-slip control.

Figure 20:
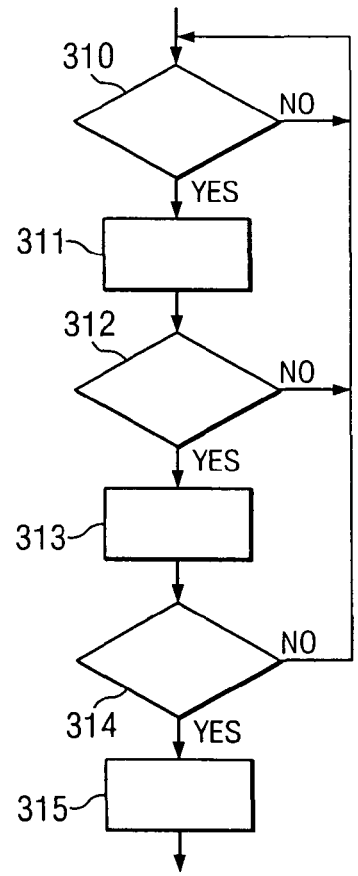
FIG. 20 shows another practical example for generation of a warning.

FIG. 20 shows a practical example of a process alternative to the process according to FIG. 19, in which a query, denoted with reference number 312, corresponds to the query 300, a step, designated with reference number 313, corresponds to step 301, a query, designated with reference number 314, corresponds to query 302, and a step, designated with reference number 315, corresponds to step 303. The process depicted in FIG. 21 depends with a query 310, whether the operating surface 16A or 116A of touchscreen 16 or 116 is touched in the region of display of operating element 171 or operating element 172. If the operating surface 16A or 116A of touchscreen 16 or 116 is touched in the region of the display of operating element 171 or operating element 172, query 310 is followed by a step 311, in which an oscillation is simulated with an amplitude of 0.2 mm and a frequency of 38.1 Hz. Step 311 is followed by query 312.

The device according to the invention can also be transferred to a multifunctional operating device according to DE 101 39 693 A1 (incorporated by reference), in which the rotational element disclosed in DE 101 39 693 A1 can be replaced by the operating elements that are configured according to operating elements 86 and 87.

LIST OF REFERENCE NUMBERS

| | |
|---|---|
| 1, 5 | Cockpit |
| 2, 6 | Steering wheel |
| 3, 7 | Dashboard |
| 4, 8, 10, 110 | Input device |
| 11, 12, 13, 14 | Spring |
| 15 | Frame |
| 15A, 15B, 15C, 15D | Connection element |
| 16, 116 | Touchscreen |
| 16A. 116A | Operating surface |
| 17 | Display |
| 18 | Actuator |
| 18A | Drive shaft pin |
| 19 | Connection piece |
| 20 | Distortion control |
| 21 | Reference element |
| 25, 27 | Spring arm |
| 26 | Connection point |
| 28 | Opening |
| 29A, 29B, 29C, 29D | Mount |
| 40 | Jump function |
| 41 | Movement |
| 42 | Oscillation |
| 43, 44 | Envelope curve |
| 45 | Control signal |
| 46, 48, 300, 302, 310, 312, 314 | Query |
| 47, 49, 301, 303, 311, 313, 315 | Step |
| 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98 | Operating elements |

-continued
LIST OF REFERENCE NUMBERS

| | |
|---|---|
| 99, 100, 101, 102, 103, 104, 141, 142, 143, 144, 145, 146, 171, 172, 173, 174, 175, 176 | |
| 55 | Internal space |
| 56 | Vehicle driver seat |
| 57 | Passenger seat |
| 58, 59 | Rear seat |
| 60 | Street map |
| 61, 70, 80, 90 | Field |
| 88 | Letter selection line |
| 200, 201, 202, 203 | Force sensor |
| AZ | Display control signal |
| F | Force |
| P | Signal |
| D | Thickness |
| HR | Main direction |
| $I_s$ | Electrical current of a control signal |
| NR | Secondary direction |
| M | Deflection |
| S | Control signal |
| T | Time |
| $\Delta F1, \Delta F2, \Delta F3$ | Force limit value |

What is claimed is:

1. An input device comprising:
a display to display a representation of an operating element, the operating element representation having a boundary defined by a displayed boundary edge;
a touchscreen overlaying the display for recognition of a position of touching of an operating surface of the touchscreen;
a force sensor connected to the touchscreen to measure a force exerted on the operating surface of the touchscreen by a touching at any of multiple different locations on the touchscreen; and
a control to:
 detect a location of a touching of the touchscreen
 distinguish between a location of the touching corresponding to the displayed boundary edge of the operating element representation and a location of the touching corresponding to an area within the boundary of the operating element representation,
 control an electro-mechanical actuator to cause a first physical movement of the touchscreen in at least one direction in response to the location of the touching corresponding to the displayed boundary edge of the operating element representation, and
 control the electro-mechanical actuator to cause a second physical movement of the touchscreen in at least one direction in response to the location of the touching corresponding to an area within the boundary of the operating element representation,
 wherein the degree of first physical movement of the touchscreen is stronger than the degree of the second physical movement of the touchscreen.

2. Input device according to claim 1, in which at least two different values of a touching force exerted on the operating surface can be distinguished by means of the force sensor.

3. Input device according to claim 1, in which the force sensor is configured as a transparent force measurement layer, integrated in the touchscreen or connected to the touchscreen.

4. Display device according to claim 3, in which the force measurement layer covers a significant part of the display.

5. Display device according to claim 1, in which the force sensor is configured as a force-dependent resistance.

6. Input device according to claim 1, the input device also comprising:
an essentially U-shaped spring for mechanical connection of the touchscreen to the display.

7. A method for operation of an input device with a display for displaying a representation of an operating element, the operating element representation having a boundary defined by a displayed boundary edge, and with a touchscreen overlaying the display for recognition of the position of touching of an operating surface of the touchscreen; the method comprising:
measuring of a touching force exerted on the operating surface of the touchscreen by a force sensor configured to detect a touching at any of multiple different locations on the touchscreen;
detecting a location of a touching of the touchscreen,
distinguishing between a location of the touching corresponding to the displayed boundary edge of the operating element representation and a location of a touching corresponding to an area within the boundary of the operating element representation,
controlling an electro-mechanical actuator to initiate a first physical movement of the touchscreen in at least one direction in response to the location of the touching corresponding to the displayed boundary edge of the operating element representation,
controlling the electro-mechanical actuator to initiate a second physical movement of the touchscreen in at least one direction in response to the location of the touching corresponding to an area within the boundary of the operating element representation,
wherein the degree of the first physical movement of the touchscreen is stronger than the degree of the second physical movement of the touchscreen.

8. Input device, the input device comprising:
a display for displaying a representation of an operating element, the operating element representation having a boundary defined by a displayed boundary edge, and for displaying information;
a touchscreen overlaying the display for recognition of a position of touching of an operating surface of the touchscreen;
a force sensor connected to the touchscreen to measure a force exerted on the operating surface of the touchscreen by a touching at any of multiple different locations on the touchscreen; and
a control to:
detect a location of a touching of the touchscreen,
distinguish between a location of the touching corresponding to the displayed boundary edge of the operating element representation and a location of the touching corresponding to an area within the boundary of the operating element representation,
generate a first control command to cause a first physical movement of the touchscreen in response to the location of the touching corresponding to the displayed boundary edge of the operating element representation, and
generate a second control command to cause a second physical movement of the touchscreen in response to the location of the touching corresponding to an area within the boundary of the operating element representation,
wherein the degree of the first physical movement of the touchscreen is stronger than the degree of the second physical movement of the touchscreen.

9. Input device according to claim 8, in which at least two different values of a touching force exerted on the operating surface can be distinguished by means of the force sensor.

10. Input device according to claim 8, in which the force sensor is configured as a transparent force measurement layer, integrated in the touchscreen or connected to the touchscreen.

11. Input device according to claim 10, in which the force measurement layer covers a significant part of the display.

12. Input device according to claim 8, in which the force sensor is configured as a force-dependent resistance.

13. Method for operation of an input device of a display for displaying a representation of an operating element, the operating element representation having a boundary defined by a displayed boundary edge, and for displaying information and with a touchscreen overlaying the display for recognition of the position of touching of an operating surface of the touchscreen; the method comprising:
measuring a touching force exerted on the operating surface of the touchscreen by a force sensor configured to detect a touching at any of multiple different locations on the touchscreen;
detecting a location of a touching of the touchscreen,
distinguishing between a location of the touching corresponding to the displayed boundary edge of the operating element representation and a location of the touching corresponding to an area within the boundary of the operating element representation,
generation of a first control command to cause a first physical movement of the touchscreen in response to the location of the touching corresponding to the displayed boundary edge of the operating element representation,
generation of a second control command to cause a second physical movement of the touchscreen in response to the location of the touching corresponding to an area within the boundary of the operating element representation,
wherein the degree of the first physical movement of the touchscreen is stronger than the degree of the second physical movement of the touchscreen.

14. Input device, the input device comprising:
a touchscreen for recognition of the position of touching of an operating surface of the touchscreen, wherein the touchscreen is operable to be arranged to cover a display that displays a representation of an operating element, the operating element representation having a boundary defined by a displayed boundary edge;
a force sensor connected to the touchscreen to measure a force exerted on the operating surface of the touchscreen by a touching at any of multiple different locations on the touchscreen;
an electro-mechanical actuator to physically move the touchscreen in at least one direction; and
a control to:
detect a location of a touching of the touchscreen,
distinguish between a location of the touching corresponding to the displayed boundary edge of the operating element representation and a location of the touching corresponding to an area within the boundary of the operating element representation,
cause a first physical movement of the touchscreen by operating the electro-mechanical actuator in response to the location of the touching corresponding to the displayed boundary edge of the operating element representation, cause a second physical movement of the touchscreen by operating the electro-mechanical actuator in response to the location of the touching corresponding to an area within the boundary of the operating element representation, in which the degree of the first physical movement of the touchscreen is stronger than the degree of the second physical movement of the touchscreen.

15. Input device according to claim 14, the input device also comprising a display arranged on an opposite side of the operating surface of the touchscreen.

16. Input device according to claim 14, in which at least two different values of a touching force exerted on the operating surface can be distinguished by means of the force sensor.

17. Input device according to claim 14, in which the force sensor is configured as a transparent force measurement layer, integrated in the touchscreen or connected to the touchscreen.

18. Input device according to claim 14, in which the force sensor is configured as a force-dependent resistance.

19. Method for operation of an input device with a touchscreen overlaying a display for recognition of the position of touching of an operating surface of a touchscreen, the display displaying a representation of an operating element, the operating element representation having a boundary defined by a displayed boundary edge; the method comprising:

the measurement of a touching force exerted on the operating surface of the touchscreen by a force sensor configured to detect a touching at any of multiple different locations on the touchscreen;

detecting a location of a touching of the touchscreen, distinguishing between a location of the touching corresponding to the displayed boundary edge of the operating element representation and a location of the touching corresponding to an area within the boundary of the operating element representation, a first physical movement of the touchscreen by an electro-mechanical actuator in response to the location of the touching corresponding to the displayed boundary edge of the operating element representation, a second physical movement of the touchscreen in response to the location of the touching corresponding to an area within the boundary of the operating element representation, in which the first physical movement or degree of the first physical movement of the touchscreen is stronger than the second physical movement or the degree of the second physical movement of the touchscreen.

20. Method according to claim 19, the method further comprising:

determining whether the touching force exerted on the operating surface of the touchscreen is greater than a first force limit value; and physical movement of the touchscreen, if the touching force exerted on the operating surface of the touchscreen is greater than the first force limit value.

21. Method according to claim 20, the method further comprising:

determining whether the touching force exerted on the operating surface of the touchscreen is greater than a second force limit value, in which the second force limit value is greater than the first force limit value; and physical movement of the touchscreen, if the touching force exerted on the operating surface of the touchscreen is greater than the second force limit value.

22. Input device, the input device comprising:

a display for display of a representation of an operating element, the operating element representation having a boundary defined by a displayed boundary edge;

a touchscreen overlaying the display for recognition of the position of a touching of an operating surface of the touchscreen;

a force sensor connected to the touchscreen to measure a force exerted on the operating surface of the touchscreen by a touching at any of multiple different locations on the touchscreen; and an electro-mechanical actuator to physically move the touchscreen in at least one direction; and a control for such operation of the electro-mechanical actuator, the control operable to:

detect a location of a touching of the touchscreen, distinguish between a location of the touching corresponding to the displayed boundary edge of the operating element representation and a location of the touching corresponding to an area within the boundary of the operating element representation, control an electro-mechanical actuator to cause a first physical movement of the touchscreen in at least one direction in response to the location of the touching corresponding to the displayed boundary edge of the operating element representation, and control the electro-mechanical actuator to cause a second physical movement of the touchscreen in at least one direction in response to the location of the touching corresponding to an area within the boundary of the operating element representation, wherein the degree of first physical movement of the touchscreen is stronger than the degree of the second physical movement of the touchscreen.

23. Input device according to claim 22, in which at least two different values of a touching force exerted on the operating surface can be distinguished by the force sensor.

24. Input device according to claim 22, in which the force sensor is configured as a transparent force measurement layer, integrated in the touchscreen or connected to the touchscreen.

25. Input device according to claim 24, in which the force measurement layer covers a significant part of the display.

26. Input device according to claim 22, in which the force sensor is configured as a force-dependent resistance.

* * * * *